United States Patent [19]

Moran

[11] 4,364,789

[45] Dec. 21, 1982

[54] METHOD OF MAKING LATERALLY CURVED DECORATIVE TRIM STRIP ASSEMBLY

[75] Inventor: Eric Moran, Burlington, Canada

[73] Assignee: P.V. Trim Limited, Mississauga, Canada

[21] Appl. No.: 233,047

[22] Filed: Feb. 10, 1981

[51] Int. Cl.³ .............................................. B32B 31/18
[52] U.S. Cl. .................................. 156/214; 156/250; 156/256; 156/267; 156/273.9; 428/31
[58] Field of Search ............... 156/196, 211, 212, 254, 156/256, 267, 272, 259, 271, 214, 475, 517; 428/31

[56] References Cited

U.S. PATENT DOCUMENTS 3,745,056 7/1973 Jackson ................................ 428/31

FOREIGN PATENT DOCUMENTS 1020199 11/1977 Canada .

*Primary Examiner*—Caleb Weston
*Attorney, Agent, or Firm*—Donald E. Hewson

[57] ABSTRACT

A decorative trim strip assembly for vehicles is provided, having a laterally curved portion formed therein. The assembly comprises a metallic backing plate and a polymeric resinous strip element (usually polyvinyl chloride) bonded to it. At least one longitudinal slit is formed in the polymeric resinous material so as to form longitudinal strip portions therein, in the area of the curved portion, and each of the longitudinal strip portions is stressed to an extent less than that which would cause undesirable deformation. In forming the decorative strip, the slit polymeric material is placed into a jig, with the ends of the slit portions thereof extending to varying amounts beyond the curve, the jigged element is then bonded to the backing plate (usually by heat bonding), and any excess amount of polymeric material extending beyond the curved portion which is not required is then trimmed off.

4 Claims, 4 Drawing Figures

METHOD OF MAKING LATERALLY CURVED DECORATIVE TRIM STRIP ASSEMBLY

FIELD OF THE INVENTION

This invention relates to decorative trim strip assemblies, particularly composite trim strip assemblies, for vehicles such as automobiles, vans, trucks, watercraft and the like. The invention relates particularly to such composite decorative trim strips that have substantially greater width than thickness, and which are curved laterally in a plane generally parallel to the plane which defines the width of the trim strip.

BACKGROUND OF THE INVENTION

Decorative trim strip assemblies have been applied to vehicles, particularly automobiles, vans and the like, for a great many years. Such trim strips have been in the form of side moldings or edgings, for both decorative and protective purposes. Usually such trim strips as body moldings and the like are formed of an extruded polyvinyl chloride or other polymeric resinous material; and they may have their outer surface covered or embossed, or a combination thereof, so as to give a particular desired decorative appearance and surface contour. For example, they may be covered with a pre-printed plastic film having such as a wood grain effect, or a metallized film such as polyethylene teraphthalate which gives the outer surface of the trim strip a metallic—usually a bright metallic—appearance. Such trim strips have generally been bonded to the surface to which they are mounted by way of an adhesive backing, and are sufficiently pliable as to adapt to the contour of the surface to which they are applied.

However, it has been the trend in vehicle design to use relatively broad or wide protective and/or decorative trim strips to define certain areas on the vehicle surface, both inside and outside the vehicle such as on doors, interior door panels, dashboards, and the like. Particularly, it has been the trend to make designs embodying wide trim strips having laterally curved portions in them, where the curve is substantially in the plane which defines the width of the trim strip.

Moreover, due to the nature of the design of such laterally curved trim strips, and their placement on or in a vehicle, it is possible that they may be secured to a rigid backing plate of sheet steel or the like, so as to secure them in place and to assure that they maintain their curved appearance and do not tend to straighten themselves by bending laterally away from the direction of the curve.

However, bending trim strips as aforementioned can create severe compressive and tensile stresses in the material of the trim strip, particularly the plastic material, on the inside and outside respectively of the neutral axis of the trim strip with respect to the direction of lateral curvature. If these stresses are excessive, the appearance of the laterally curved trim strips is affected, and they may be crazed, stretch marked, wrinkled or corrugated, or the covering film or material may be torn.

One attempt to overcome the above problems has been to cast the portion of the decorative trim strip which is laterally curved, and then to assemble it with conventional extruded trim strip having the same general appearance in an appropriate manner according to the vehicle assembly procedures. However, it may very often happen that the cast portion has a different appearance, colour or contour than the remaining extruded portions; and in any event, it is comparatively very expensive since it requires the preparation of injection molding dies and the use of additional molding equipment.

One particular attempt to solve the above problems has been proposed by LOEW in Canadian Pat. No. 1,020,199, issued Nov. 1, 1977. What Loew has done is to provide a plurality of strips of polymeric resinous material which are fitted side by side in the curved portion of a composite decorative trim strip. The various longitudinal strips may have differing widths, and each individual strip is stressed to an extent that does not exceed the stress resistance of the material of the respective strip. [The term "stress resistance" is defined hereafter.] All of the strips are bonded in a side-by-side fashion to a supporting substrate.

However, the cost of handling, and extruding separate longitudinal polymeric strips, and assembling them one at a time, can become excessive; and may require some compromise in the design and appearance of the outer surface of the strip, so that the abutting edges of the various individual strips are not highly visible. Moreover, Loew generally calls for overlapped relationship of adjacent strips in the composite decorative trim strip, which requires assembly in the correct order, so that the handling and general labour costs in producing each formed composite decorative trim strip having a lateral curvature may become quite high.

"Stress resistance" of a longitudinal trim strip or a longitudinal portion of a trim strip is defined as being the limit or ability to which the plastic trim strip may be laterally bent in a curvature such that the compressive and tensile forces set up on the inside and outside, respectively, of the neutral axis in that strip do not cause an apparent visible surface aberration or failure. Such surface failure may, as noted above, include crazing, tearing, stretch marking, wrinkling or corrugating, any of which is undesirable and is usually unacceptable when present in a laterally curved decorative trim strip of the sort contemplated herein.

OBJECTS OF THE INVENTION

The present invention overcomes a number of these difficulties by providing that a conventional extruded polymeric resinous material trim strip having the desired width and surface contour may be easily and inexpensively handled in such a manner that an unstressed laterally curved trim strip assembly is achieved. This means, then, that it is not necessary to separately extrude various longitudinal portions which, together, provide a composite strip having the requisite width and surface contour, so that additional handling and extruding costs can be eliminated. Moreover, the present invention provides an effective method for assembling a decorative trim strip having a laterally curved portion therein, such that the assembled trim strip and backing plate are securely bonded one to the other, with the requisite curved and surface appearance on the outer side thereof, away from the backing plate.

Putting the above in other words, the width of each longitudinal portion of the polymeric resinous material strip element in the region of the at least one longitudinal slit which is formed in said strip element—and which is therefore positioned in a place so as to extend completely around the curved portion and onwards to one end of the decorative trim strip—is such that stress resistance of each respective longitudinal portion of the single, extruded polymeric resinous material strip element, is not exceeded for the curvature thereof in the curved portion of the decorative trim strip assembly.

The method by which a decorative trim strip assembly may be made, according to this invention, therefore comprises the steps of providing an elongated polymeric resinous material strip element having the desired width and surface configuration, and providing the backing plate which has the laterally curved portion formed therein to the desired configuration thereof, making at least one longitudinal slit in the polymeric resinous material strip element and placing it in a jig which also has the desired configuration, so that the slit extends in the strip element past and around the curved portion to one end of the element, and then bonding the plastic strip element to the metallic backing plate. Thereafter, any ends of the slit portions of the single slitted strip element which extend beyond a predetermined distance relative to the end of the backing plate, are cut off.

Accordingly the present invention provides a decorative trim strip assembly and a method of making the same, economically and easily, and particularly as compared to prior assemblies and methods.

A further object of this invention is to provide a method which is easily carried out by relatively unskilled labour.

Yet a further object of this invention is to provide a decorative trim strip assembly having a laterally curved portion formed therein, which may be formed in virtually any extruded trim strip, thereby permitting greater design freedom for a vehicle designer.

BRIEF DESCRIPTION OF THE DRAWINGS

These and other features and objects of the invention are more clearly described and discussed hereafter, in association with the accompanying drawings, in which.

DESCRIPTION OF THE PREFERRED EMBODIMENTS

Figure 1:
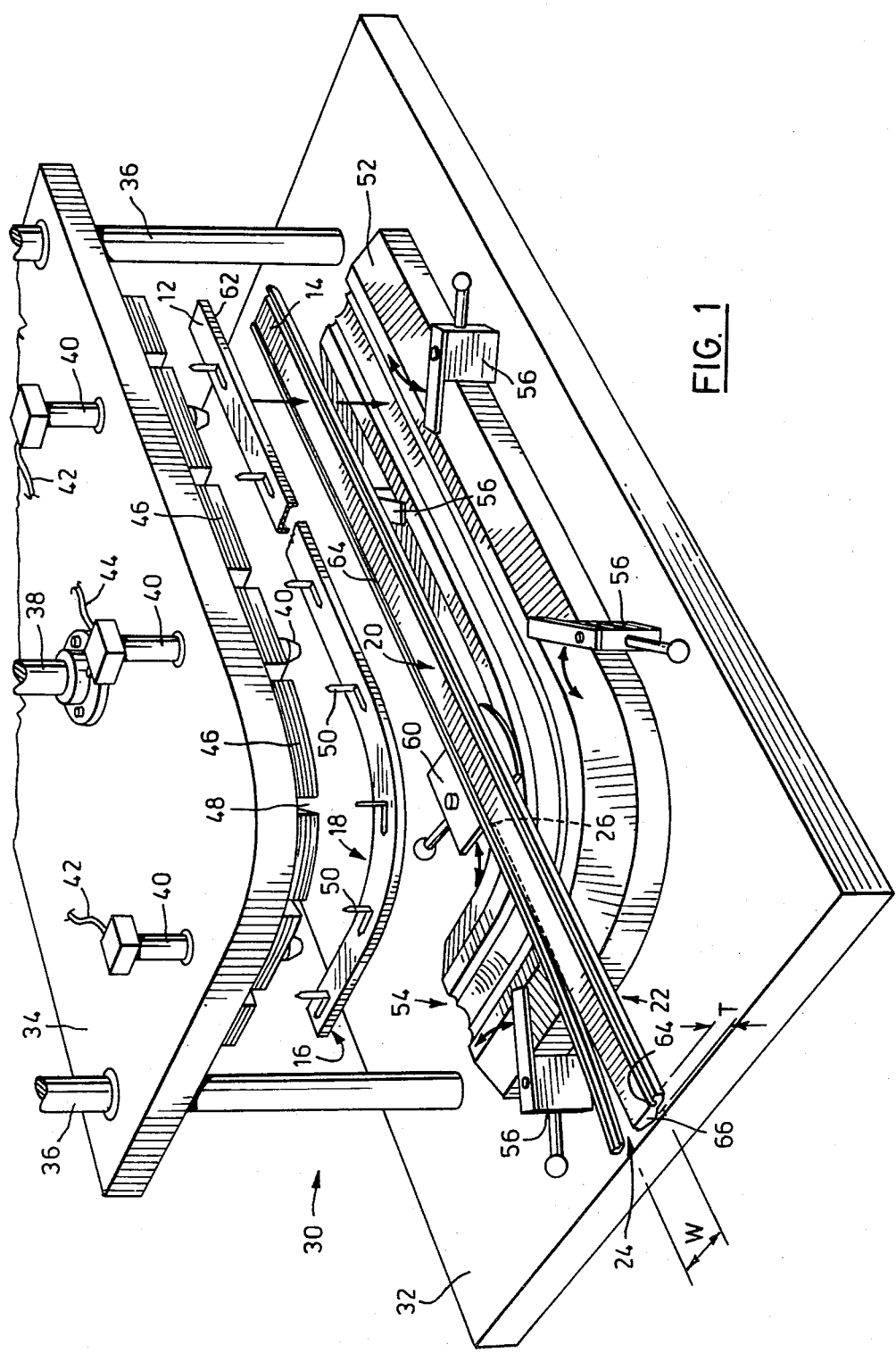
FIG. 1 is a partially schematic, partially idealized perspective view of an assembly apparatus for making decorative trim strip assemblies having laterally curved portions formed therein, and showing the relative unassembled relationship of the two major components of such assembly, namely an elongated polymeric resinous material strip element and a substantially rigid metallic backing plate.

As stated, this invention provides a decorative trim strip assembly having a laterally curved portion formed therein, where the decorative trim strip assembly comprises a substantially rigid metallic backing plate 12 and an elongated polymeric resinous material strip element 14. The metallic backing plate 12 has a substantially planar face 16 (the underside of the backing plate 12 as shown in FIG. 1), and has a laterally curved portion 18 formed therein where the curve is to the desired configuration. As seen from FIG. 1, the backing plate 12 is laterally curved in the portion 18 in a plane which is parallel to the substantially planar face 16.

The elongated polymeric resinous material strip element 14 has substantially greater width than thickness, as indicated by the designations "W" and "T" in FIG. 1. The strip element 14 has a substantially planar first surface 20, and the opposite surface 22 to the first surface 20 has a desired decorative appearance and surface contour. Obviously, the decorative appearance and surface contour of the surface 22 of the plastic strip element 14 may be such as is desired by the vehicle designer.

At least one longitudinal slit 24 is formed in the plastic strip element 14; and as will be seen hereafter, the longitudinal slit 24 is formed so as to be from a place 26 which is situated beyond a first end of the curved portion 18 which will be formed in the plastic strip when it is assembled to the backing plate 12. The longitudinal slit 24 extends around the curve to the end of the strip element 14 which is remote from the first end of the curve 18 where the slit has started.

Referring now specifically to FIG. 1, an apparatus is shown in which the decorative strip assembly of the present invention is made, and within which the assembly method of the present invention is carried out. That apparatus, designated generally at 30, has a fixed base plate 32 and a movable upper plate 34, which moves upwards and downwards along guide rods 36, two of which are shown. The driving force for the upper plate 34 is transferred to it by such as a rod 38 secured to a drive cylinder (not shown).

Extending through the upper plate 38 and electrically insulated from it are electrodes 40, three of which are shown in the apparatus of FIG. 1, which number is generally sufficient for purposes of the present invention. The electrodes 40 may conveniently by attached to the source of low voltage, high current electricity, such as a pair of series transformers or a centre-tap transformer, by wires 42 from the two outer electrodes and wire 44 from the inner electrode which goes to the centre tap or the common connection between the series transformers. Of course, any suitable source of electric power may be used, in keeping with ordinary skill Beneath the undersurface of the upper plate 34, there are located a number of cooling blocks 46. The exact number and spacing of the cooling blocks 46 is determined by the size and configuration of the trim strip to be assembled; and in the embodiment shown, there are a number of gaps 48 between the cooling blocks 46 which accommodate the connector stems or tongs 50 formed in the backing plate 12.

On the bottom plate 32, there is a jig fixture 52, which has formed in its upper face 54 the configuration of the lateral curve 18 which is desired for the decorative trim strip assembly being made, and the upper face of the jig fixture 52 is conveniently contoured in such a manner as to accommodate the surface contour 22 of the polymeric resinous material strip element 14.

Figure 2:
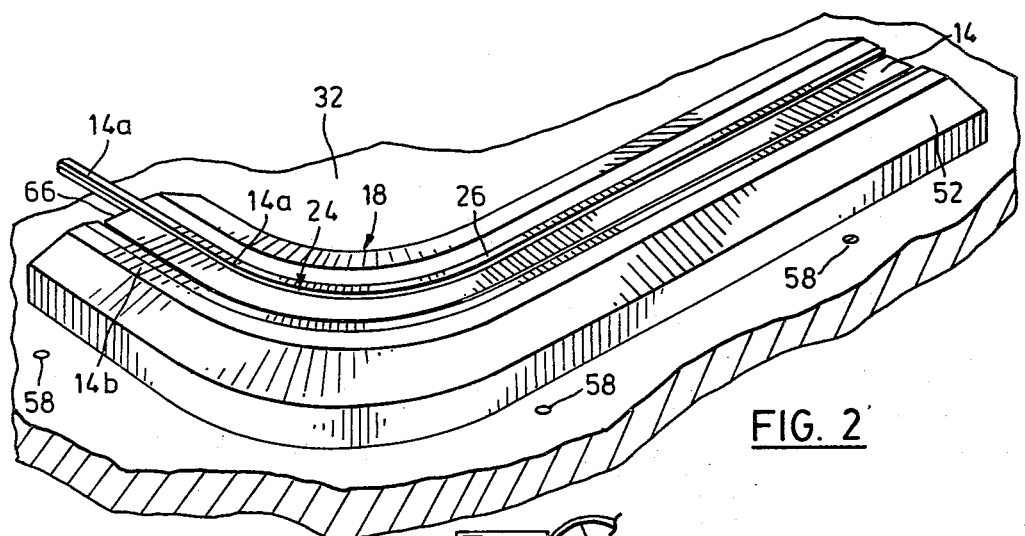
FIG. 2 is a partial perspective view showing the elongated polymeric resinous material strip element assembled into a jig fixture shown in FIG. 1.

A number of hold-down elements 56 are rotatably mounted above the bottom plate 32, on either side of the jig fixture 52, and conveniently have pins which extend into holes 58 formed in the bottom plate 32 for those purposes (shown in FIG. 2). Additionally, another hold-down element 60 is mounted on the bottom plate 32, on the inside of the curved portion 18 of the jig fixture 52.

Ordinarily, the rigid metallic backing plate 12 is of lesser width that the polymeric resinous material strip element 14, (as shown in the drawings) but not necessarily so, and it may conveniently have a pair of edge flanges 62 which are formed and dimensioned so as to extend into a pair of recesses 64 formed longitudinally in the first surface 20 of the strip element 14.

As seen in FIG. 2, the strip element 14 is assembled into the jig fixture 52 in such a manner that the contoured face 22 fits downwards into the accommodating contoured portion of the jig fixture. In the embodiment illustrated, there is a single slit 24 formed in the strip element 14, beginning from a point 26; and as seen in FIG. 2, the point 26 is so related to the curved portion 18 that it is at a first end of the curved portion. The slit 24 thus divides the strip element 14 into two portions, in this case, designated 14a and 14b; and the slit 24 extends from the first end of the curve at the point 26 to the end 66 of the strip element 14 which is beyond the curved portion remote from the first end thereof.

As clearly seen in FIG. 2, when the polymeric resinous material strip element 14 is assembled into the jig fixture 52, the portion 14a extends somewhat beyond the end 66 of the portion 14b. Indeed, where a plurality of slits may be formed, each of the portions will extend to a differing amount beyond the curved portion 18.

What is of particular importance is the fact that each of the portions 14a and 14b in the embodiment shown (and, in any event, all of the slit portions defined by the one or more longitudinal slits 24 formed in the strip element 14) is stressed to an extent in the area of the curvature 18 less than the amount of stress for such portion which is defined above as its stress resistance limit. In other words, the width of each longitudinal strip portion 14a and 14b in the region of the longitudinal slit 24 which extends from the point 26 is such that the stress resistance of that respective longitudinal portion is not exceeded for the curvature thereof as defined by its relative position to the inside or outside of the curved portion 18 of the decorative trim strip being assembled.

In the assembly procedure for the decorative strip assembly of the present invention, once the polymeric resinous material strip element 14 has been assembled into the jig fixture 52 in the manner suggested in FIG. 2 (but without limitation to that which is shown), the preformed substantially rigid metallic backing plate 12 is positioned over the jigged strip element 14. In the precise embodiment shown, the edge flanges 62 extend downwardly into the recesses 64 which are extruded in the surface 20 of the strip element 14. The strip element is, of course, held in its place in the jig fixture 52 by the hold-down members 56 and 60, which extend over the outer edges of the surface 20 of the strip element 14 sufficiently to secure it in place, (see especially FIGS. 3 and 4). The electrodes 40 are then lowered so that their lower ends contact the back or upper surface (in this case) of the backing plate 12, and the electric power is then turned on so that the backing plate 12 forms a resistance heating element in a circuit which comprises the electrodes and the backing plate 12 connected across the source of electric power. The electrodes may be a carbon/nickel alloy, or any other low resistance element of the sort which may be readily available for purpose similar to the resistance heating purposes to which they are put in the present invention.

Figure 3:
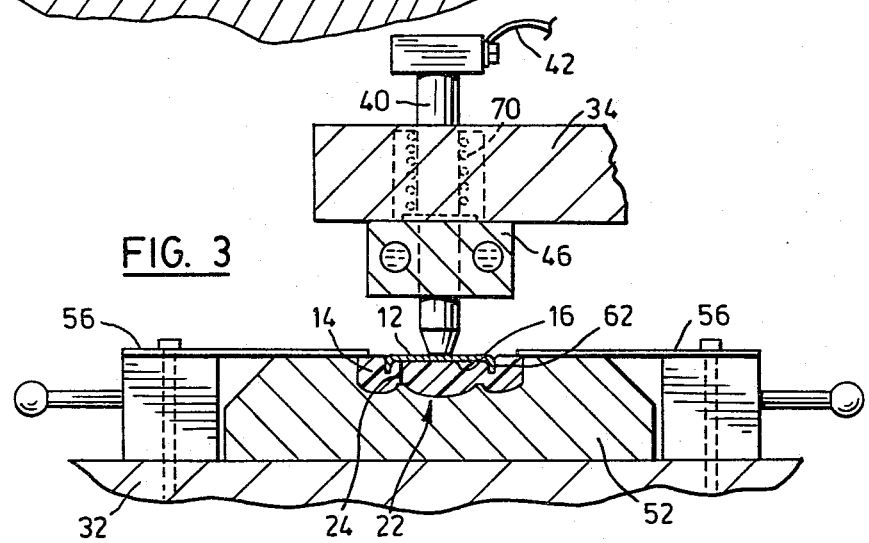
FIG. 3 is a cross-sectional area showing operative components of the apparatus of FIG. 1 as they are situated during the heating cycle of the assembly method according to this invention; and, FIG. 4 is similar to FIG. 3 showing the operative components as they are situated during the cooling cycle of the assembly method according to this invention.

It will be noted from a comparison of FIGS. 3 and 4 that the electrode 40 are spring loaded by spring 70 so as to extend below the bottom surface of the cooling blocks 46. When the upper plate 34 is forced downwardly, as in FIG. 4, the spring 70 compresses, thereby permitting the cooling blocks 46 to contact the backing plate 12, without damage to the electrodes 40 or the backing plate 12.

As the backing plate 12 becomes hot due to its own electrical resistance, there is an induction heating of the polymeric resinous material strip element 14, due to the heat within the backing plate 12, so that a heat bonding of the material of the strip element 14 to the backing plate 12 may be achieved.

Figure 4:
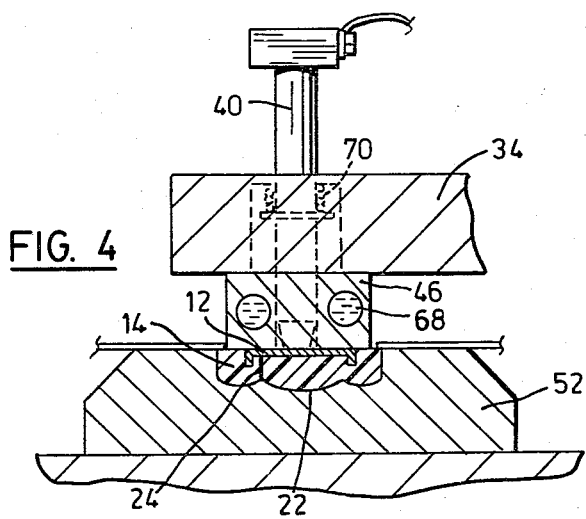

After a sufficient length of time that the heat bonding of the backing plate 12 to the strip element 14 is assured, the upper plate 34 with the cooling block 46 is lowered so that the cooling block 46 contacts the upper or rear surface of the metallic backing plate 12, (see FIG. 4). At the same time, the supply of electrical power to the electrodes 40 is terminated. Conveniently, the cooling blocks 46 have channels or tubes 68 formed in them through which a suitable cooling medium such as water may be pumped. A very rapid cooling of the metallic backing plate 12 and the polymeric resinous material strip element 14 which is, by now, heat bonded to the backing plate 12, is thereby assured.

Following the cooling cycle, pressure against the movable upper plate 34 is relieved and the plate withdrawn upwardly, following which the assembled decorative trim strip assembly may be removed from the jig fixture 52. Thereafter, the ends of any of the portions such as the portion 14a of the slitted strip element 14 which extend beyond a predetermined distance relative to the end of the backing plate 12, are cut off, thus concluding the assembly operations for the decorative trim strip assembly having a laterally curved portion formed therein, according to the present invention.

It should be noted, of course, that the assembled decorative trim strip assembly may be such that the backing plate 12 and the elongated polymeric resinous material strip element 14 are bonded together other than by heat bonding. For example, a suitable adhesive material may be placed on one or both of the contacting surfaces, which may be heat activated or pressure activated, so as to achieve the bond; and, indeed, if it is heat activated then the steps of the method according to the present invention would, in any event, be followed, as discussed above.

As stated, generally the elongated polymeric resinous material strip element is formed of extruded polyvinyl chloride material. Further, as noted above, the contoured face 22 of the strip element 14 may have secured to it such other materials as a pre-printed vinyl or a metallized polyethylene teraphthalate.

The material of the backing plate 12 may be other than steel, in certain circumstances, providing that a bonding system—either adhesive or heat bonding—may be set up between the backing plate and the polymeric resinous material strip element. However, in the usual circumstances, the backing plate 12 is formed of steel, and as noted above, the polymeric resinous material is usually polyvinyl chloride.

As discussed above, the slit 24—one or more of them—is placed across the width of the strip element 14 in any convenient place, and in any event is placed in such a position that the width of each longitudinal portion of the strip element 14 in the region of the slit is such that the stress resistance of each respective longitudinal portion is not exceeded for the curvature thereof in the curved portion of that respective longitudinal portion. Where the contoured and decorative surface 22 of the strip element 14 is such that specific sections of it are delineated by discontinuities or reversals of curvature, or by transition from one form of decorative surface to another (such as from a metallized appearance to a woodgrain appearance), the longitudinal slit 24 may conveniently be placed at such boundaries. However, by carefully and properly jigging the material, it may be possible to place the longitudinal slit in other places, subject to the condition that the stress resistance for each longitudinal portion of the slit polymeric strip element is not exceeded for the curvature of each respective slitted portion.

By way of example only, the following details concern one specific embodiment of many different embodiments of trim strip which have been produced according to the present invention. An extruded polyvinyl chloride strip, having a cross section similar to that illustrated in FIGS. 3 and 4, was produced having an overall width of 1.020 inches, and the thickest dimension of the extruded polyvinyl chloride strip was 0.275 inches. The radius of curvature at the innermost edge of the assembled, laterally curved trim strip was 2.750 inches. On the face of the trim strip opposite the steel backing plate, there was placed a decorative strip of polyvinyl chloride having a woodgrain effect, and having a thickness of 0.006 inches; and an aluminized mylar bilaminate polyester/polyvinyl chloride strip having a thickness of 0.004 inches was placed at each side of the face of the assembly. The heating cycle, during which time the steel backing plate was heated, was 30 seconds; and the cooling cycle, during which time the cooling block were in contact with the steel backing plate, was also 30 seconds. Many other laterally curved decorative trim strip assemblies having differing dimensions of width and thickness, different radii of curvature, and so on, have been assembled according to this invention, with the cooling and heating times being adjusted accordingly, considering the mass of the steel plate and the mass of extruded polyvinyl chloride strip being secured during the assembly proceedure.

Other materials, jigging and tooling assemblies, bonding techniques, or details or orientation of assembly, may be altered or amended as will occur expedient to the ordinary practitioner, without departing from the sprit and scope of the appended claims.

I claim:

1. A method of making a decorative trim strip assembly having a laterally curved portion formed therein, comprising the steps of:

providing an elongated polymeric resinous material strip element having substantially greater width than thickness, and having a substantially planar first surface; and a substantially rigid metallic backing plate having a substantially planar face, and having a laterally curved portion formed therein to a desired configuration in a plane parallel to said substantially planar face;

making at least one longitudinal slit in said polymeric resinous material strip element, and placing said slitted element in a jig having the desired configuration and holding the same therein so that said slit extends in said strip element from a place situated beyond a first end of said curved portion to the end of said strip element which is beyond said curved portion remote from said first end thereof;

and bonding said substantially planar face of said backing plate to said substantially planar first surface of said strip element;

and thereafter cutting off the ends of any slit portions of said slitted strip element extending beyond a pre-determined distance relative to the end of said backing plate.

2. The method of claim 1, where said elongated polymeric resinous material strip element has its surface opposite to said first surface with a desired decorative appearance and surface contour, and is placed with said last-mentioned surface downwards into said jig, said jig being so configured as to accommodate said surface contour; and said backing plate is placed over said first surface of said strip element for bonding thereto.

3. The method of claim 1, where said bonding of said backing plate to said strip element is by heat bonding, and said bonding step comprises firstly electric resistance heating of the assembled backing plate and strip element, and then cooling said assembly.

4. The method of claim 3, where said heating step is achieved by contacting said backing plate to electrodes at at least two places along its length; and said cooling step is achieved by contacting said backing plate to cooling elements substantially along its entire length.

* * * * *